United States Patent Office 3,384,197
Patented May 21, 1968

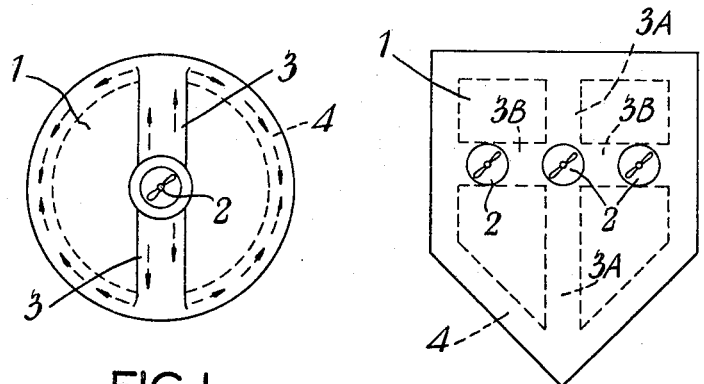
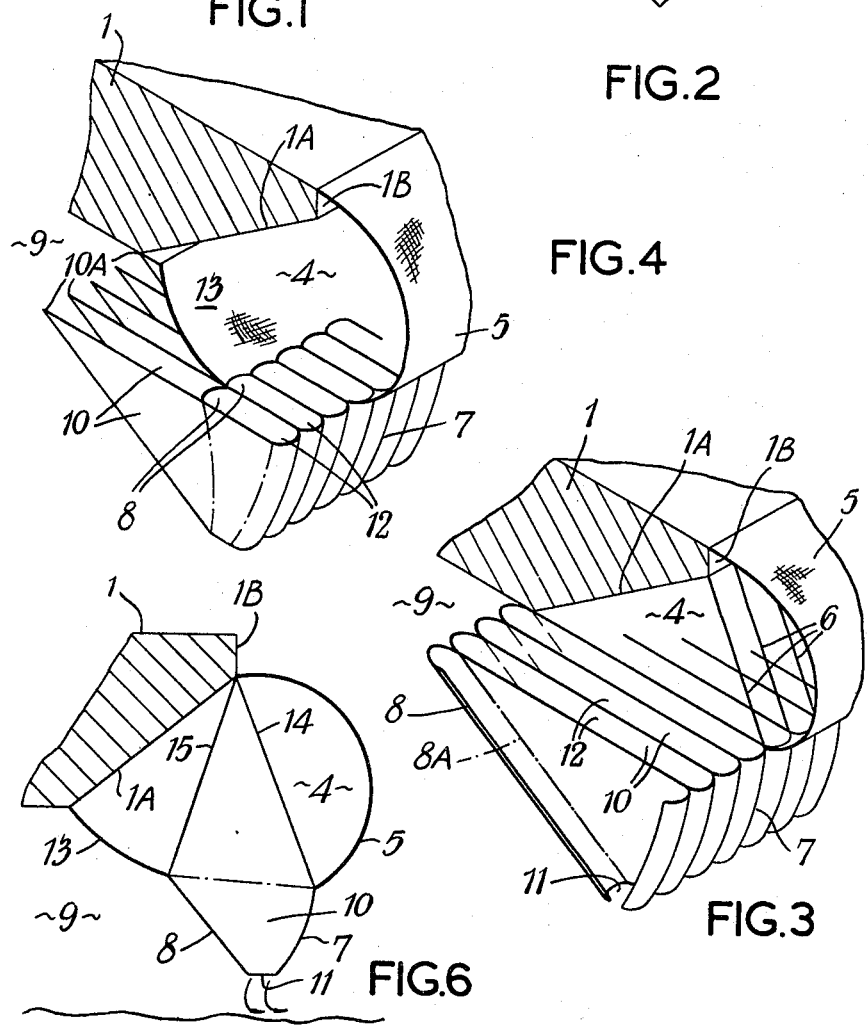

3,384,197
AIR CUSHION-BORNE VEHICLES
WITH FLEXIBLE SKIRTS
Alan Edgar Bingham, Swindon, and Gordon Victor Watts,
Lydiard Millicent, near Swindon, England, assignors to
Vickers-Armstrongs (Engineers) Limited, London, England, a British company
Filed Mar. 9, 1965, Ser. No. 438,187
Claims priority, application Great Britain, Mar. 11, 1964,
10,395/64
15 Claims. (Cl. 180—117)

ABSTRACT OF THE DISCLOSURE

An air cushion vehicle comprising a vehicle body adapted to be supported by an air cushion enclosed within a skirt of flexible material supported from the peripheral portion of the vehicle body. The skirt includes an upper flexible strip having the upper edge attached to the vehicle body and a lower skirt portion attached to the lower edge of the flexible strip, the skirt having inwardly extending webs forming a plurality of side-by-side pockets with the inner portions of the web being connected with the vehicle body.

---

This invention relates to air cushion-borne vehicles.

According to the present invention there is provided a vehicle having a vehicle body adapted to receive support from an air cushion, the body being provided with a distribution duct for connection to a source of air under pressure and leading to a further duct extending along at least part of the periphery of the vehicle body, there being a skirt of flexible material depending from said part of the periphery of the vehicle body, the further duct being arranged to deliver air to the top of the skirt on the inside thereof, the arrangement being such that in operation air passes from the bottom of the skirt in the form of an air curtain sustaining the cushion.

For a better understanding of the invention and to show how the same may be carried into effect reference will now, by way of example, be made to the accompanying drawings, in which:

FIGURE 1 is a diagrammatic plan view of an air cushion-borne vehicle,

FIGURE 2 is a diagrammatic plan view of another air cushion-borne vehicle,

Figure 5:
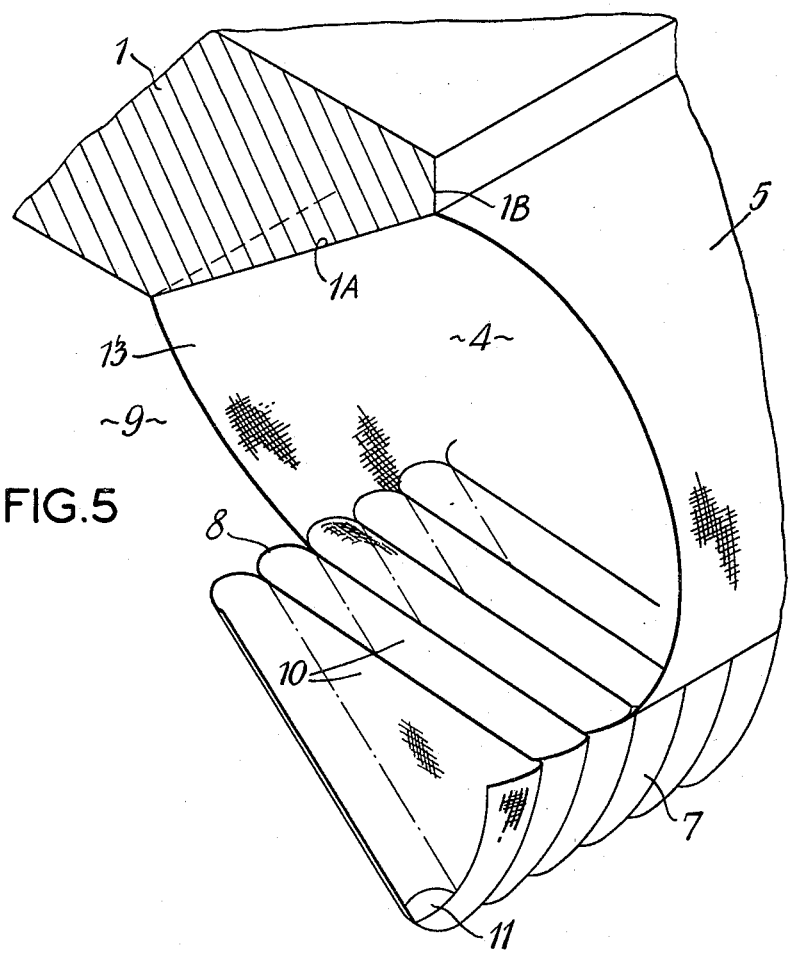
Figure 4A:
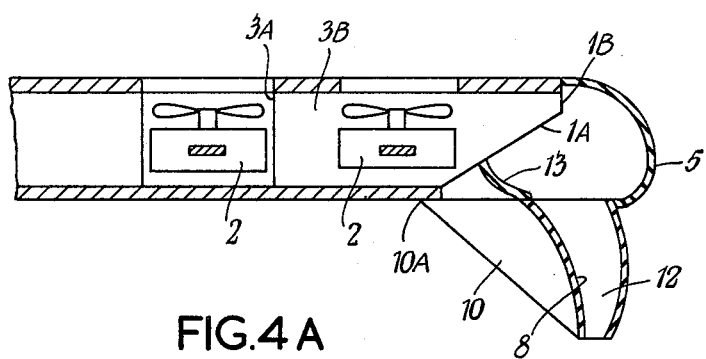
Figure 7:
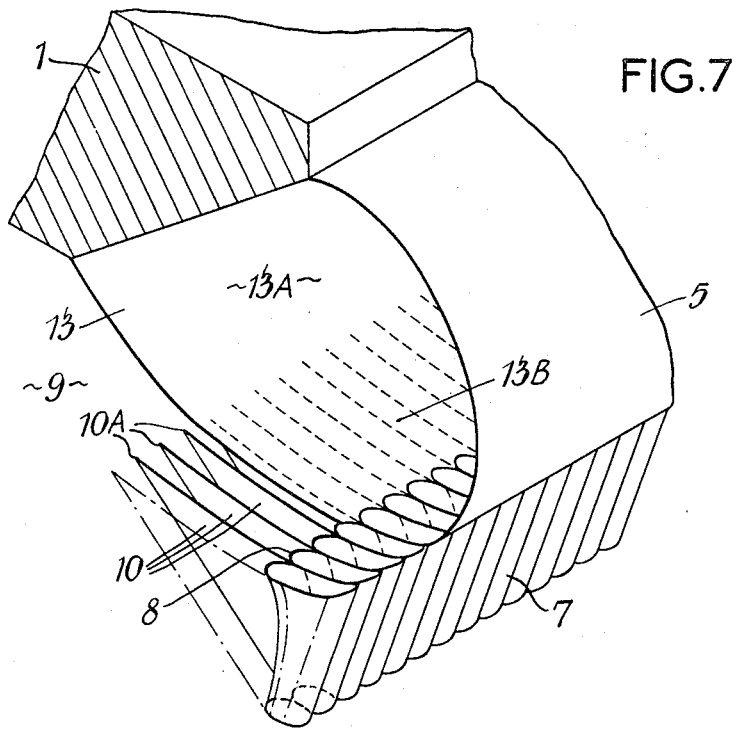
Figure 9:
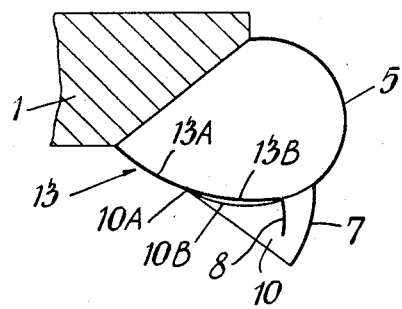
Figure 8:
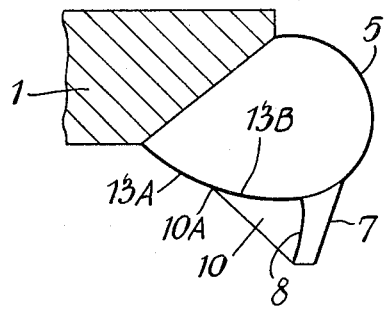
Figure 10:
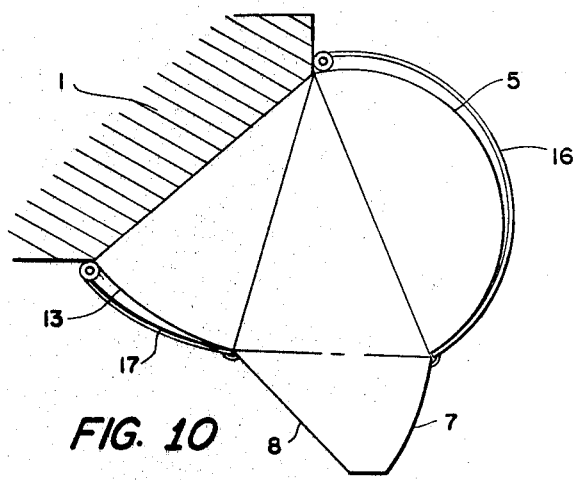
Figure 11:
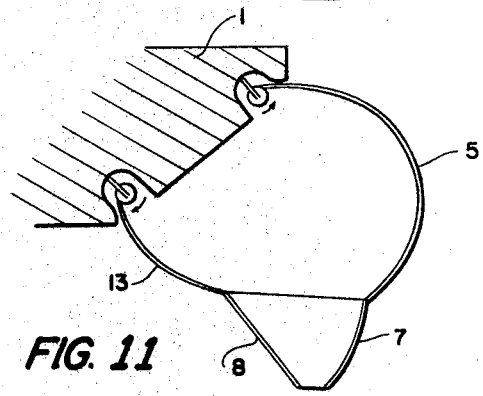
Figure 12:
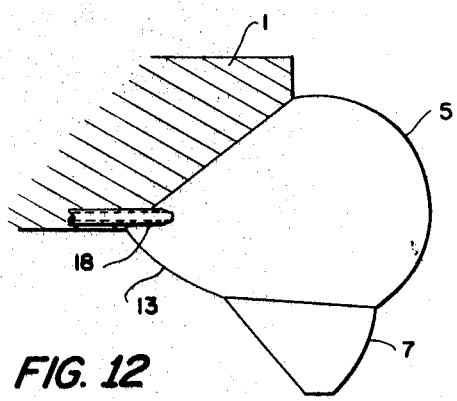

FIGURE 3 is a diagrammatic cut-away perspective view of part of an air cushion-borne vehicle and showing a skirt construction that can be used with either the vehicle of FIGURE 1 or that of FIGURE 2, FIGURE 4 is a view similar to that of FIGURE 3, of a modified skirt construction that can be used with either the vehicle of FIGURE 1 or that of FIGURE 2, FIGURE 4A is a diagrammatic cross-sectional view of the vehicle of FIGURE 2 provided with the skirt construction shown in FIGURE 4, FIGURES 5 and 7 are views similar to FIGURE 3 showing two further modified skirt constructions that can be used with either the vehicle of FIGURE 1 or that of FIGURE 2, FIGURE 6 is, to a reduced scale, a cross-sectional elevation of the construction of FIGURE 5, FIGURE 8 is, to a reduced scale, a cross-sectional elevation of the construction of FIGURE 7, FIGURE 9 is a view similar to FIGURE 8 illustrating modifications, and FIGURES 10 to 12 are cross-sectional elevations of modified skirt constructions.

The air cushion-borne vehicle of FIGURE 1 has a vehicle body 1 with a compressor 2 mounted centrally thereon. Radially directed distribution ducts 3 lead air from the compressor outlet to a ring main duct 4 that extends around the whole periphery of the vehicle body. It is to be noted that the duct 4 is not spaced from the body 1. The duct 4 supplies air to a skirt construction (not shown in FIGURE 1) on the underside of the peripheral part of the vehicle body and which directs air downwardly to form an annular air curtain that encloses an air cushion that is formed beneath the vehicle body 1 and supports the vehicle.

FIGURE 2 shows a vehicle having a vehicle body 1 with three compressors 2 mounted thereon. The compressors 2 deliver air to longitudinal and transverse distribution ducts 3A and 3B opposite ends of which communicate with a ring main duct 4 extending around the whole of the periphery of the vehicle body 1. The ring main duct 4 conveys air to a skirt construction not shown in FIGURE 2 on the underside of the vehicle body and which is arranged for producing a curtain of downwardly directed air to sustain a cushion beneath the vehicle body 1 for supporting the vehicle.

The ducts 3, 3A and 3B of FIGURES 1 and 2 may be incorporated into the rigid structure of the vehicle body 1 or may be situated above or below the vehicle body 1 in which case they may be wholly or partially of flexible material. If desired the ducts 3, 3A and 3B may be employed to supply air through orifices extending across the underside of the vehicle body thereby to form air curtains compartmenting the cushion. Alternatively, the ducts 3, 3A and 3B may supply orifices of limited lateral extent through which air is directed downwardly into the cushion for vehicle stabilisation purposes. These orifices would be of limited lateral extent so that the air issuing therefrom does not form a curtain compartmenting the cushion.

FIGURE 3 shows one form of skirt construction that may be employed either with the vehicle of FIGURE 1 or the vehicle of FIGURE 2. The vehicle body 1 (FIGURE 3) has a bevelled surface 1A on the underside of its periphery. The upper edge of a flexible strip 5 is secured to the upper edge of the periphery of the vehicle body 1, the strip running along the periphery of the vehicle body. The lower edge of the strip 5 is attached to the periphery of the vehicle body 1 by ties 6. An outer flexible wall 7 has its upper edge secured to the lower edge of the strip 5. The wall 7 is of corrugated form, the corrugations running in the up and down direction and being convex on their outer surfaces. The upper edge of an inner flexible wall 8 extends downwardly and outwardly from the underside of the peripheral part of the vehicle body 1. The wall 8 is also corrugated, the corrugations extending in the up and down direction and being convex inwardly, i.e., the convex surfaces face the air cushion 9. Parallel vertical webs 10 of flexible material join the fold lines 8A of the wall 8 to corresponding fold lines of the wall 7. The bottom of the outer wall 7 is spaced from the bottom of the inner wall 8 so that an orifice 11 is formed at the bottom of each pocket 12 formed by an adjacent pair of webs 10 and the parts of the inner and outer walls 7 and 8 that are between the pair of webs 10. The walls 7 and 8 and the webs 10 constitute a hollow skirt on the peripheral part of the vehicle body 1 whilst the surface 1A and the strip 5 cooperate with the skirt to form the ring main duct 4. The individual orifices 11 co-operate to form in effect a single orifice extending along the whole of the bottom of the skirt.

In operation of the vehicle having the skirt construction of FIGURE 3, the distribution duct 3 or the ducts 3A and 3B deliver air to the ring main duct 4 which conveys air to all the pockets 12. The air flows into the tops of the pockets and out through the orifices 11 at the bottom thereof to form the air curtain that sustains the cushion 9.

The ties 6 may if desired be omitted.

The extent to which the skirt of FIGURE 3 depends below the underside of the vehicle body 1 can be varied by adjusting the lengths of the ties 6, or, in the absence of the ties, by varying the pressure within the ring main duct 4 thereby causing a change in shape of the strip 5. In cases where the ties 6 are employed they may be used to retract the skirt into the space defined by the surface 1A, the plane of the underside of the body 1 and the plane of the vertical surface 1B of the body 1.

FIGURE 4 shows a modified form of the skirt construction of FIGURE 3. The ties 6 are dispensed with and the inner wall 8 of the skirt instead of having its upper edge attached to the underside of the vehicle body is displaced outwardly to a position almost directly below the outermost surface 1B of the vehicle body. The upper edge of the wall 8 in the FIGURE 4 arrangement is attached to the lower edge of a flexible strip 13 that extends inwardly and upwardly and has its upper edge secured to the surface 1A. The webs 10 extend inwardly of the wall 8 and have their innermost parts 10A secured to the underside of the vehicle body 1. The ring main duct 4 is in FIGURE 4 formed by the strips 13 and 5, the surface 1B, a part of the surface 1A and the top of the skirt. As with the construction of FIGURE 3, air issues downwardly out of the bottoms of the pockets 12 of FIGURE 4 to form the air curtain that sustains the cushion 9. The attitude of the skirt may be changed by varying the pressure in the duct formed by strips 5 and 13. This additional pressure may be supplied through a nozzle such as shown in FIGURE 12 at 18.

FIGURE 4A is a broken sectional view through a portion of the vehicle of FIGURE 2 illustrating the vehicle as fitted with a skirt construction of the form shown in FIGURE 4. In this view one of the distribution ducts 3B is shown connected into the ring duct, which is open along its underside and delivers air to the top of the skirt comprising outer and inner walls 7 and 8.

The modified form of skirt construction of FIGURES 5 and 6 is similar to that of FIGURE 4, except that in the form of FIGURES 5 and 6 the webs 10 are not extended inwardly of the wall 8. The attitude adopted by the skirt of FIGURES 5 and 6 depends on the pressure in the ring main duct 4. If desired ties 14 and/or ties 15 may be provided for adding a restraint to the attitude of the skirt. The ties 14, when provided, extend from the top of the strip 5 to the bottom thereof and the ties 15, when provided, extend from the top of the strip 5 to the bottom of the strip 13. A control device (not shown) may be provided for altering the lengths of the ties 14 and/or 15 thereby to vary the attitude of the skirt. Alternatively as shown in FIGURE 11 a control device similar to a roller blind may be provided on the body 1 at the top of the strip 5 or 13 for altering the arcuate dimension of the strip 5 or 13, whereby the skirt attitude can be varied. Change in the attitude of the skirt can be employed for changing the attitude of the vehicle. Hence, pitch, roll and heave of the vehicle can be controlled by controlling skirt attitude.

The skirt construction illustrated in FIGURES 3 to 6 may be modified so that the pockets 12 are separately constructed, each pocket consisting of an outer member corresponding to one corrugation of the wall 7, and an inner member corresponding to one corrugation of the wall 8, these two members being joined together by two webs 10. Adjacent webs 10 of adjacent pockets 12 are joined to each other solely along the upper edges of the webs. In the undeflected condition of the skirt adjacent webs of adjacent pockets abut against each other to minimise or prevent air from the cushion 9 leaking therebetween. It will be understood that in such constructions the walls 7 and 8 are not continuous, each consisting of a plurality of side-by-side ordinarily contiguous members.

FIGURE 7 shows a skirt construction that is similar to that of FIGURE 4 except that in the FIGURE 7 arrangement the innermost parts 10A of the webs 10 do not extend inwards as far as the vehicle body 1. The parts 10A are attached to an intermediate part of the strip 13. Thus the webs 10 are attached to the vehicle body 1 via the inner part 13A of the strip 13. The top edges of the webs 10 are attached to the outer part 13B of the strip 13.

FIGURE 9 illustrates a skirt construction that is the same as that of FIGURES 7 and 8 apart from two modifications. These are, firstly, that the top edges 10B of the webs 10 are (apart from the parts 10A) not secured to the part 13B of the strip 13, and, secondly, the inner wall 8 is shorter than the outer wall 7 so that the latter projects downwardly below the bottom edge of the wall 8.

In each of the skirt constructions considered above the tension loads in the upper edges of the webs 10 have to be diffused into the strip 13 and/or the strip 5 for transmission to the vehicle body 1. In an alternative arrangement as shown in FIGURE 10, however, a tie 16 may be provided extending from the outer upper edge of the top of each web 10, around the strip 5 to the body 1 to which the ties are attached. As shown in FIGURE 10 similar ties 17 may extend from the upper edge of the top of each web 10 where the latter joins the wall 8 around the strip 13 to the body 1 to which the ties are attached. Such ties would have the effect of reinforcing the strips 5 and 13 which can therefore be made of light material. Where the pockets 12 are separate from each other except for the joints along the tops of the webs 10, a single tie may be passed between each pair of contiguous webs 10 and around the outsides of the strips 5 and 13, the ends of each such tie being secured to the vehicle body 1.

Although the vehicles have been described as each having a ring main duct 4 extending around the whole of the periphery of the body of the vehicle, the ring main duct may be replaced by one or more ducts of limited length extending along the periphery of the vehicle body each such duct being supplied with air from at least one distribution duct connected to receive air from a compressor.

What is claimed as new is:

1. An air cushion vehicle comprising a vehicle body supported by an air cushion, a skirt of flexible material depending from at least part of the periphery of the vehicle body, the skirt being hollow and formed by inner and outer walls of flexible material, a first strip of flexible material having upper and lower edges, the upper edge of the outer wall being secured to the lower edge of said first strip and the upper edge of said strip being secured to the vehicle body, a second strip of flexible material having upper and lower edges, the upper edge of the inner wall of the skirt being secured to the lower edge of said second strip and the upper edge of this strip being secured to the vehicle body at a location spaced from the upper edge of the first strip, webs at intervals along the length of the skirt, each web joining the inner wall to the outer wall so that the skirt assumes the form of a plurality of side-by-side pockets, the bottom of the outer wall of the skirt being spaced from the bottom of the inner wall of the skirt thereby to form an orifice, the inner surfaces of the first and second strips, the top of the skirt and that surface of the vehicle body that is between the upper edges of the two strips forming a duct extending along said part of the periphery of the vehicle body to deliver air to the top of the skirt which air passes down the pockets and through the orifice to form an air curtain sustaining the cushion.

2. An air cushion vehicle comprising a vehicle body supported by an air cushion, the underside of the vehicle body having a bevelled peripheral portion, a flexible strip extending around at least a portion of the periphery of the vehicle body and connected to the vehicle body above the bevelled portion, said flexible strip having the upper edge thereof secured to the vehicle body, a corrugated flexible skirt extending around at least a portion of the periphery of the vehicle body and contiguous with the flexible strip, the upper outer edge of the flexible skirt being connected to the lower edge of the flexible strip, said skirt including inwardly extending web portions, said web portions being connected with the vehicle body below the bevelled portion, the area bounded by the lower edges of the flexible skirt and the web portions forming air outlets, the flexible strip extending outwardly of the peripheral edge of the vehicle and supporting the flexible skirt in operative position when the vehicle body is supported by an air cushion with the flexible strip and the connection between the webs and the vehicle body providing means for transmitting tension loads in the upper edges of the webs to the vehicle body.

3. An air cushion vehicle according to claim 2 and further including means to vary the attitude of the flexible skirt to control pitch, roll and heave of the air cushion vehicle.

4. An air cushion vehicle according to claim 2 wherein the flexible skirt comprises a plurality of individual wall members having web portions integrally formed therewith, the plurality of wall members being disposed in side by side contiguous relation.

5. An air cushion vehicle comprising a vehicle body supported by an air cushion, a skirt of flexible material depending from at least part of the periphery of the vehicle body, the skirt being hollow and formed by inner and outer walls of flexible material, a distribution duct having first and second ends, the first end being at a central part of the vehicle body for connection to a source of air under pressure, the second end being at the periphery of said body, a first strip of flexible material having upper and lower edges, the upper edge of the outer wall being secured to the lower edge of said first strip and the upper edge of said strip being secured to the vehicle body, a second strip of flexible material having upper and lower edges, the upper edge of the inner wall of the skirt being secured to the lower edge of said second strip and the upper edge of this strip being secured to the vehicle body at a location spaced from the upper edge of the first strip, webs at intervals along the length of the skirt, each web joining the inner wall to the outer wall so that the skirt assumes the form of a plurality of side-by-side pockets, the bottom of the outer wall of the skirt being spaced from the bottom of the inner wall of the skirt thereby to form an orifice, the inner surfaces of the first and second strips, the top of the skirt and that surface of the vehicle body that is between the upper edges of the two strips forming a further duct communicating with the second end of the distribution duct and extending along said part of the periphery of the vehicle body to deliver air to the top of the skirt which air passes down the pockets and through the orifice to form an air curtain sustaining the cushion.

6. A vehicle as claimed in claim 5, wherein the webs are extended inwardly of the inner wall and have their innermost parts secured to the underside of the vehicle body.

7. A vehicle as claimed in claim 5, wherein means are provided for varying the pressure in the further duct thereby to change the attitude adopted by the skirt.

8. A vehicle as claimed in claim 5, wherein ties are provided extending from the top of at least one of the walls to the vehicle body, there being a control device for altering the effective lengths of the ties thereby to vary the attitude of the skirt.

9. A vehicle as claimed in claim 5, and further comprising a control device for varying the effective length of either strip between its upper and lower edges, thereby to change the attitude of the skirt.

10. A vehicle as claimed in claim 5, wherein ties passing along the outside of the first strip secure the tops of the outermost parts of the webs to be vehicle body.

11. A vehicle as claimed in claim 5, wherein ties passing along the outside of the second strip secure the parts of the webs adjacent the top of the inner wall to the vehicle body.

12. A vehicle as claimed in claim 5, wherein the outer wall of the skirt is constituted by a plurality of discrete side-by-side members extending in the up and down direction, the inner wall being similarly constituted by discrete side-by-side members extending in the up and down direction, the edges extending up and down of each member of the outer wall being joined to corresponding edges of a member of the inner wall by webs so that the skirt is constituted by a series of side-by-side pockets each pocket being formed by a member of the outer wall, a member of the inner wall and two webs, each web of each pocket abutting, in the undeflected condition of the skirt, against an adjacent web of an adjacent pocket, each web of each pocket being joined along its top to the top of the adjacent web of the adjacent pocket and a tie being passed between each abutting pair of webs, one portion of the tie passing along the outside of the first strip and being secured to the vehicle body and another portion of the tie passing along the outside of the second strip and being secured to the vehicle body.

13. A vehicle as claimed in claim 5, wherein the webs are extended inwardly and have their innermost parts secured to a part of said second strip that is intermediate the upper and lower edges thereof.

14. A vehicle as claimed in claim 13, wherein the top edges of the parts of the webs that extend inwardly beyond the inner wall are secured to said second strip.

15. A vehicle as claimed in claim 13, wherein, apart from the innermost parts thereof, the top edges of the webs are not secured to said second strip.

References Cited

UNITED STATES PATENTS

| | | | |
|---|---|---|---|
| 3,182,740 | 5/1965 | Cockerell | 180—7 |
| 3,260,323 | 7/1966 | Henry | 180—7 |
| 3,272,272 | 9/1966 | Hall et al. | 180—7 |
| 3,291,239 | 12/1966 | Eggington et al. | 180—7 |

A. HARRY LEVY, *Primary Examiner.*